United States Patent
Gotoh et al.

(10) Patent No.: US 6,981,118 B2
(45) Date of Patent: *Dec. 27, 2005

(54) STORAGE CONTROL SYSTEM

(75) Inventors: Youichi Gotoh, Odawara (JP); Shizuo Yokohata, Naka (JP)

(73) Assignee: Hitachi, Ltd., Tokyo (JP)

( * ) Notice: Subject to any disclaimer, the term of this patent is extended or adjusted under 35 U.S.C. 154(b) by 9 days.

This patent is subject to a terminal disclaimer.

(21) Appl. No.: 10/798,599

(22) Filed: Mar. 10, 2004

(65) Prior Publication Data

US 2004/0172506 A1  Sep. 2, 2004

Related U.S. Application Data

(63) Continuation of application No. 10/113,970, filed on Mar. 28, 2002, now Pat. No. 6,728,850.

(30) Foreign Application Priority Data

Oct. 23, 2001  (JP)  ............................. 2001-325132

(51) Int. Cl.[7] ............................................. G06F 12/00

(52) U.S. Cl. ..................................... 711/167; 711/154

(58) Field of Search ....................... 711/111–114, 148, 711/154, 167

(56) References Cited

U.S. PATENT DOCUMENTS

| | | | | | |
|---|---|---|---|---|---|
| 4,796,110 A | * | 1/1989 | Glass et al. | .................... | 360/53 |
| 5,018,060 A | * | 5/1991 | Gelb et al. | .................. | 707/205 |
| 5,367,473 A | * | 11/1994 | Chu et al. | .................. | 702/186 |
| 5,564,037 A | * | 10/1996 | Lam | .......................... | 711/161 |
| 6,144,961 A | * | 11/2000 | de la Salle | ................... | 707/10 |
| 6,189,080 B1 | * | 2/2001 | Ofer | ........................... | 711/167 |
| 6,272,571 B1 | * | 8/2001 | Bachmat | ...................... | 710/74 |
| 6,301,639 B1 | * | 10/2001 | Cleavinger et al. | ......... | 711/112 |
| 6,470,420 B1 | * | 10/2002 | Hospodor | ................... | 711/114 |

FOREIGN PATENT DOCUMENTS

JP  08-263380  10/1996

* cited by examiner

Primary Examiner—Nasser Moazzami
(74) Attorney, Agent, or Firm—Townsend and Townsend and Crew LLP

(57) ABSTRACT

For each of a plurality of storage devices, there is stored a response time required from when an input/output request sent from a host processor is received until when a processing result of the request is sent to the host processor. One or a plurality of response-time upper limit values assigned respectively to one or a plurality of files to be stored in the storage device are stored and managed. The upper limit value of the file to be stored and each of the response times of the storage devices are compared, and according to the comparison result, a storage device for storing the file is selected. Through such a structure, an operational form of a storage control device may be optimized.

15 Claims, 11 Drawing Sheets

RESPONSE TIME INFORMATION MANAGEMENT TABLE

| STORAGE DEVICE (201) | RESPONSE TIME MAX. VALUE (202) | AVAILABLE CAPACITY (203) | STORED FILE (204) |
|---|---|---|---|
| CACHE MEMORY | 1ms | 10GB | /tmp /data |
| MAGNETIC DISK DEVICE A | 50ms | 100GB | ccc.tbl ddd.tbl |
| MAGNETIC DISK DEVICE B | 100ms | 300GB | eee.dat |
| MAGNETIC DISK DEVICE C | 500ms | 900GB | backup.dat |
| MAGNETIC DISK DEVICE D | 10s | 110GB | fff.dat |

200

RESPONSE TIME INFORMATION MANAGEMENT TABLE

| STORAGE DEVICE | RESPONSE TIME MAX. VALUE | AVAILABLE CAPACITY | STORED FILE |
|---|---|---|---|
| CACHE MEMORY | 1ms | 10GB | /tmp /data |
| MAGNETIC DISK DEVICE A | 50ms | 100GB | ccc.tbl ddd.tbl |
| MAGNETIC DISK DEVICE B | 100ms | 300GB | eee.dat |
| MAGNETIC DISK DEVICE C | 500ms | 900GB | backup.dat |
| MAGNETIC DISK DEVICE D | 10s | 110GB | fff.dat |

FIG. 2

FILE MANAGEMENT TABLE

| FILE NAME |
|---|
| RESPONSE TIME UPPER LIMIT VALUE |
| STORAGE DEVICE |
| UPPER LIMIT VALUE SETTING INFORMATION |

FIG. 3

INPUT/OUTPUT REQUEST MANAGEMENT TABLE

INPUT/OUTPUT REQUEST MANAGEMENT QUEUE 500

FILE GENERATION REQUEST

INPUT/OUTPUT REQUEST NOTIFICATION TABLE

DATA TRANSFER REQUEST NOTIFICATION TABLE

DATA TRANSFER REQUEST MANAGEMENT TABLE

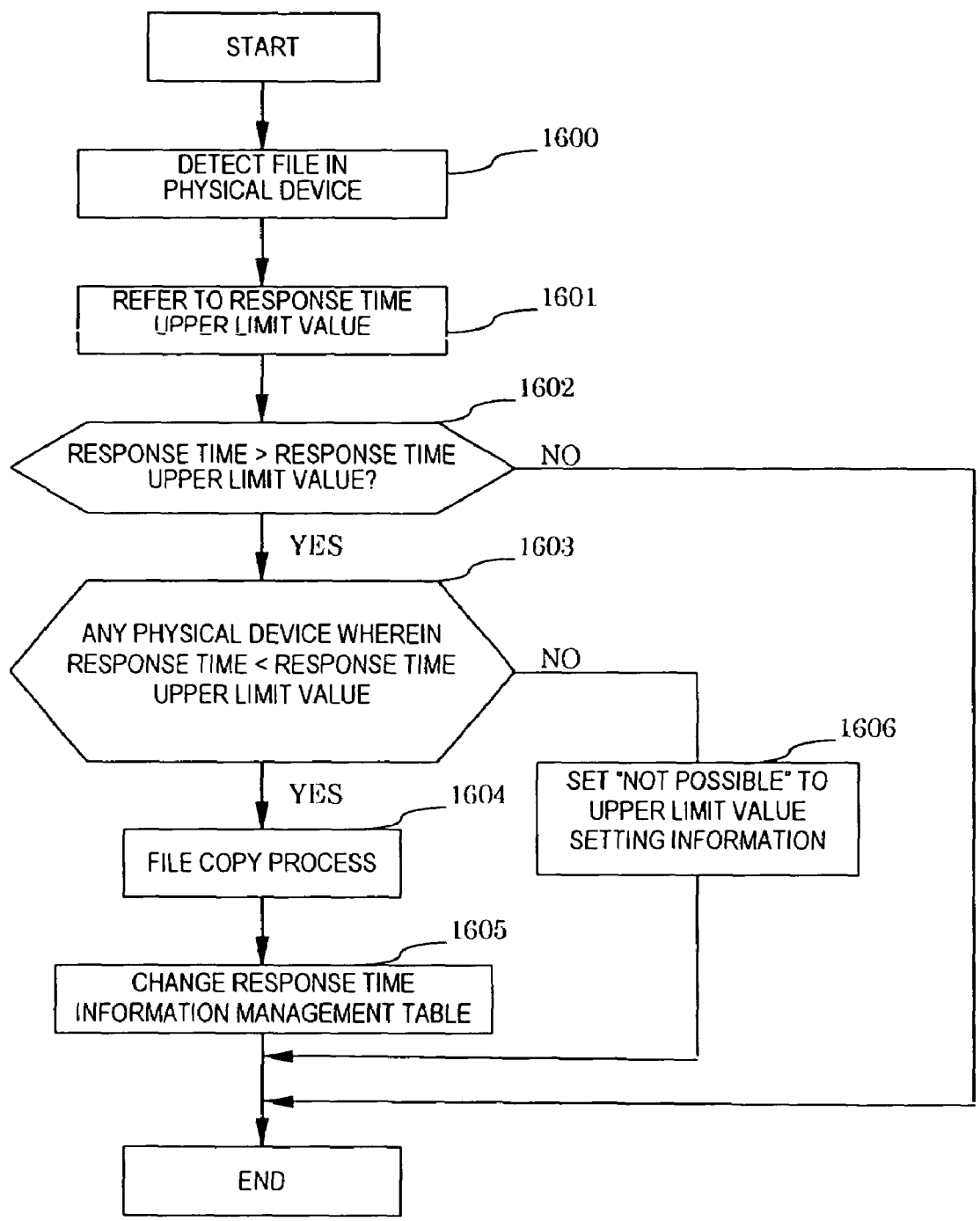

STORAGE CONTROL SYSTEM

BACKGROUND OF THE INVENTION

The present application claims priority upon Japanese Patent Application No. 2001-325132 filed on Oct. 23, 2001, which is herein incorporated by reference.

1. Field of the Invention

The present invention relates to a storage control device which stores and manages data sent from a host processor connected to communicate therewith, and particularly relates to a technique for optimizing a operational form of the storage control device.

2. Description of the Related Art

As is well known, processing performance of a computer system comprising a host processor, such as a host computer, and a storage control device, such as a disk array device, connected thereto highly depends on a processing speed of an input/output process from the storage control device to the host processor. A typical conventional technique for improving the processing speed of the storage control device is, for example, utilization of a cache memory, and various attempts have been made in the past regarding an efficient utilization of the cache memory (for example, refer to Japanese Patent Application Laid-open Publication No. 8-263380).

Incidentally, jobs conducted by the host processor in operation generally include both a job requiring a high input/output processing priority such as a transaction processing or an image data transmission, and a job that does not require much priority. In such a case, it is preferable upon operation of the computer system to prioritize the input/output process of a job having high priority.

However, in a conventional computer system, there are many cases where circumstances of the host processor are not always reflected in the processing of the storage control device. For example, even when there is contention between jobs in trying to allocate a cache memory resource, an order of data processing is not decided according to the processing priority. Thus, there may be cases where a low processing priority job (i.e., a job having a low processing priority) may be processed with priority over a high processing priority job (i.e., a job having a high processing priority).

SUMMARY OF THE INVENTION

An object of the present invention is to optimize an operational form of a storage control device by reflecting a processing priority of each job kept track of by a host processor to a processing of a storage control device. In order to solve the above and other problems, an aspect of the present invention includes a storage control device configured store a plurality of response times respectively corresponding to each of a plurality of storage devices, wherein data sent from the host processor is stored in one of the storage devices, and the response time of a storage device is the time between receiving an input/output request from the host processor and when a processing result of the request is sent to the host processor. The storage controller is configured to store response-time upper limit values assigned respectively to files to be stored in the storage devices; and is further configured to determine a storage device from the plurality of storage devices for storing a file based on a comparison of its upper-limit value and the response times of the storage devices.

BRIEF DESCRIPTION OF THE DRAWINGS

For a more complete understanding of the present invention and the advantages thereof, reference is now made to the following description taken in conjunction with the accompanying drawings wherein:

FIG. 2 is a diagram showing a response time information management table according to an embodiment of the present invention;

FIG. 3 is a diagram showing a file management table according to an embodiment of the present invention;

FIG. 16 is a flowchart explaining a file rearranging process according to an embodiment of the present invention.

DESCRIPTION OF THE PREFERRED EMBODIMENTS

Figure 1:
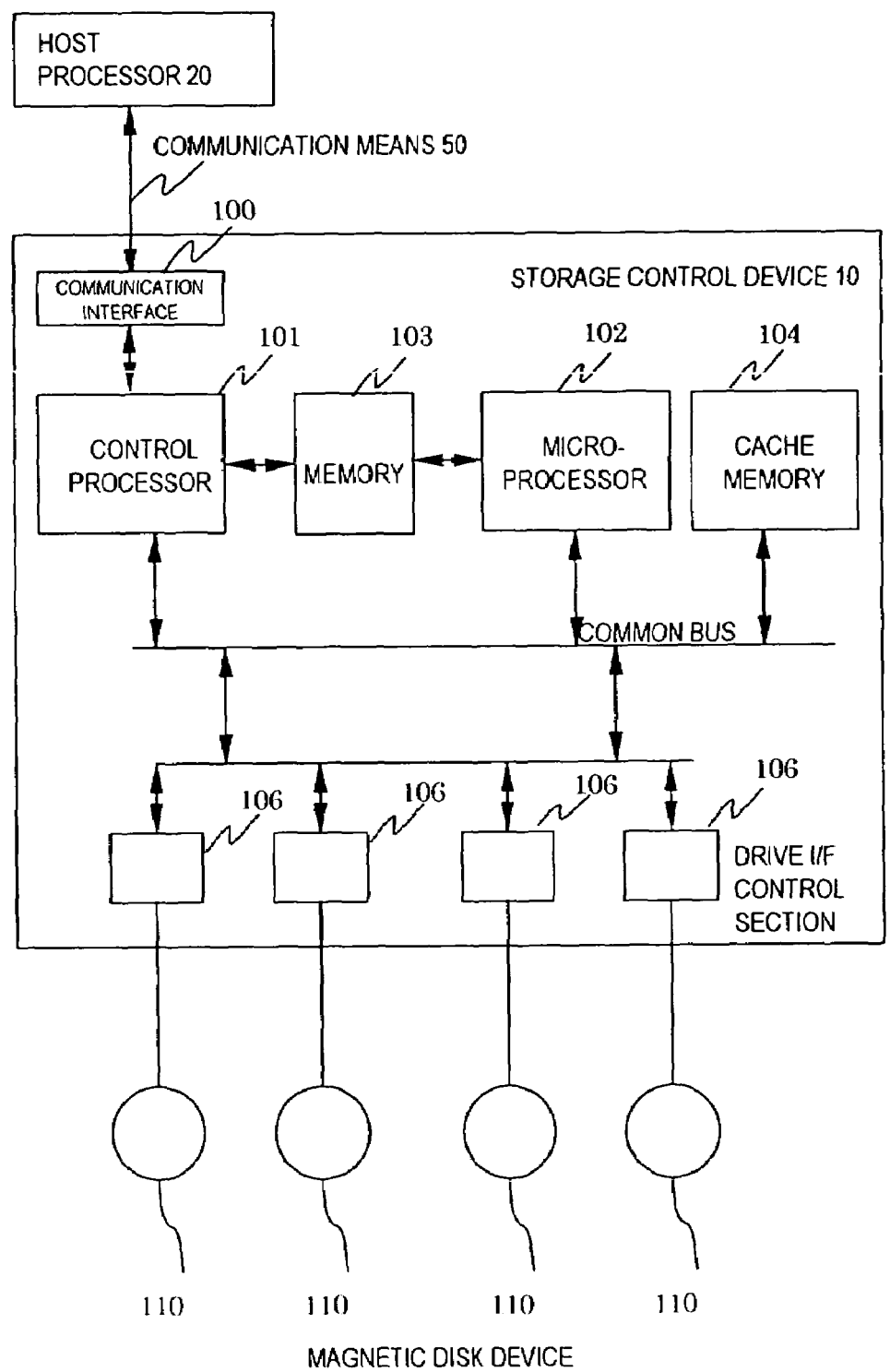
FIG. 1 is a diagram showing a schematic structure of a storage control device according to an embodiment of the present invention.

FIG. 1 is a schematic structure of a storage control device 10 described as an embodiment of the present invention. The storage control device 10 is connected with a host processor 20 via a communication means 50 such as a LAN or a SAN.

A communication interface 100 is connected to the communication means 50, and controls the communication with the host processor 20. A control processor 101 controls communication with the host processor 20, and performs processes such as file management according to a predetermined file management method which may be, for example, FAT16 (File Allocation Table 16), FAT32 (File Allocation Table 32), NTFS (NT File System), HPFS (High Performance File System), or the like.

A microprocessor 102 mainly conducts such as control of data input/output to a cache memory 104, and control of one or a plurality of magnetic disk devices 110. A memory 103 is utilized when the control processor 101 and microprocessor 102 manage data and tables. A drive I/F control portion 106 controls such as the magnetic disk device(s) 110 in accordance with an order sent from mainly the control processor 101 or the microprocessor 102. In the following explanations, the term "storage device" refers not only to the magnetic disk device 110, but also the cache memory 104, unless as otherwise stated.

The memory 103 stores various tables, a queue 500, and the like. A response time information management table 200 is shown in FIG. 2. This table stores a response time 202, an available capacity 203, a file name and/or a directory name of stored files and the like regarding the respective storage devices mounted in the storage control device 10.

To the response time 202, there is set a maximum time that is required from when the storage control device 10 receives some sort of processing request from the host processor 20 until when such result of processing is sent to the host processor 20. To the available capacity 203, there is stated an available capacity 203 of the storage device which the storage control device 10 monitors real time.

FIG. 3 shows a file management table 300 stored in the memory 103. This table is generated corresponding to the files and directories stored in the storage device. To the file name 301, there is set a file name or a directory name corresponding to this file management table. To the response time upper limit value 302 in this table, there is set an upper limit value 302 of time required from when the storage control device 10 receives a request from the host processor 20 for processing of a file or a directory corresponding to this table until when a result of the processing is sent to the host processor 20, in case the storage control device 10 receives such request. To the storage device 303, there is set an identification name of a storage device in which the file corresponding to this table is actually stored.

Figure 4:
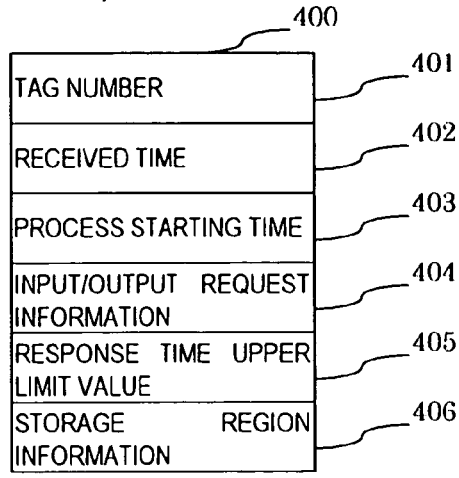
FIG. 4 is a diagram showing an input/output request management table according to an embodiment of the present invention.

FIG. 4 is an input/output request management table 400 stored in the memory 103. This table is made for every input/output request whenever the storage control device 10 receives an input/output request from the host processor 20. To the TAG number 401, there is set an identification is number of the input/output request To the received time 402, there is set a time that the storage control device 10 received the input/output request. To the process starting time 403, there is set a time that the storage control device 10 started an I/O process relating to the input/output request.

To the input/output request information 404, there is set contents of the input/output request (for example, I/O processing commands such as a read command or a write command) which the storage control device 10 has received from the host processor 20. To the response time upper limit value 405, there is set an upper limit value of response time requested by the host processor 20 regarding this input/output request. To the storage region information 406, there is set information designating a storage region of a storage device which is an object to be accessed in the process of this input/output request.

Figure 5:
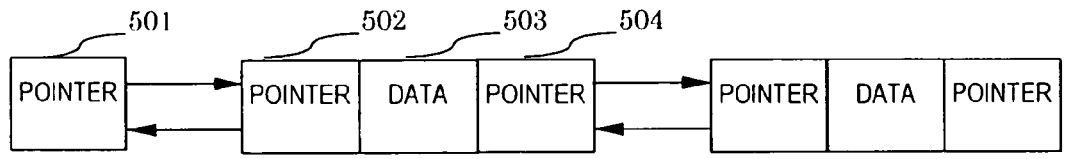
FIG. 5 is a diagram showing an input/output request management queue according to an embodiment of the present invention.

FIG. 5 shows a queue 500 generated at a time a control processor 101 processes the input/output request. The queue 500 takes the form of a bi-directional list, and is stored in the memory 103. The input/output request management table 400 is set at a position shown as data 503.

Figure 6:
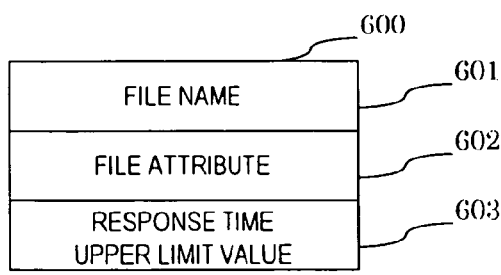
FIG. 6 is a diagram showing a file generation request according to an embodiment of the present invention.

FIG. 6 shows a file generation request 600 sent from the host processor 20 to the storage control device 10. To this data, there are described a file name 601 given to a file to be generated, a file attribute 602 such as a write-in authority, and a response time upper limit value 603 set for the file generated by this file generation request 600.

Figure 7:
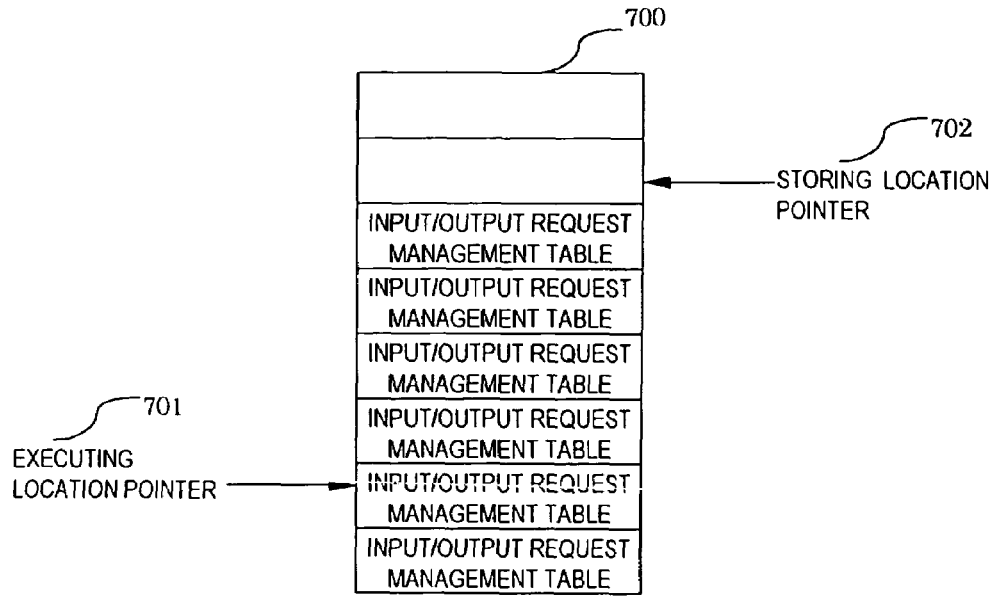
FIG. 7 is a diagram showing an input/output request notification table according to an embodiment of the present invention.

FIG. 7 shows an input/output request notification table 700 stored in the memory 103. One or more input/output request management tables 400, to be an object of processing, are registered to this table. Further, attending this table 700, there is stored an executing location pointer 701 and a storing location pointer 702. The executing location pointer 701 indicates an address to where there is stored an input/output request management table 400 for an input/output request to be processed next after the input/output request being presently processed. The storing location pointer 702 indicates an address containing a newly generated input/output request management table 400.

Figure 8:
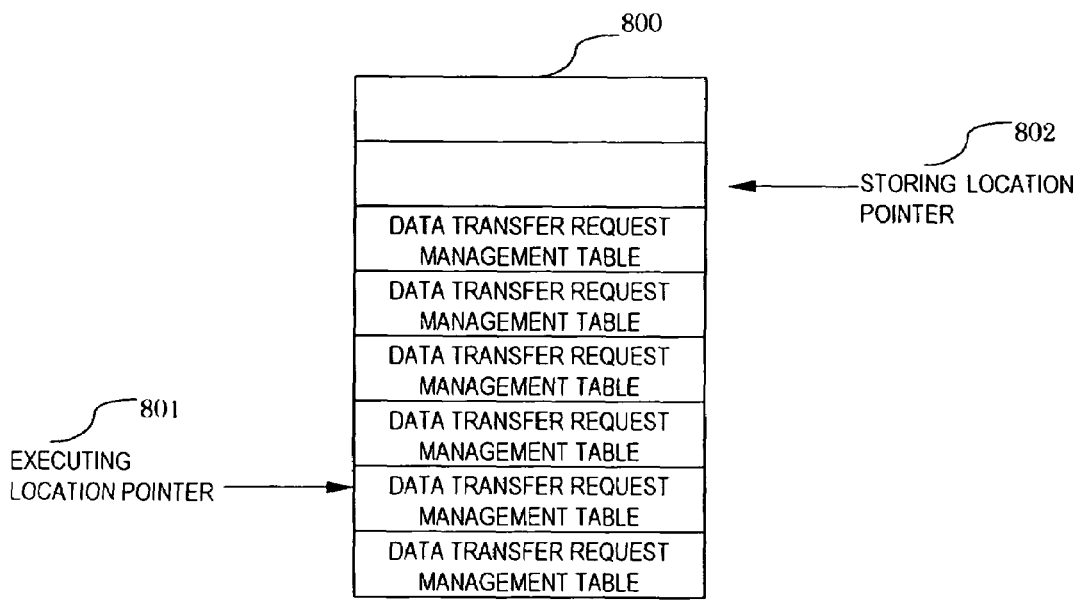
FIG. 8 is a diagram showing a data transfer request notification table according to an embodiment of the present invention.
Figure 9:
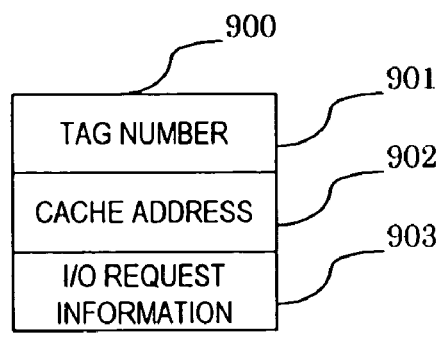
FIG. 9 is a diagram showing a data transfer request management table according to an embodiment of the present invention.

FIG. 8 shows a data transfer request notification table 800 stored in the memory 103. One or more data transfer request management tables 900 to be processed are registered to this table. Further, attending this table 800, there are provided an executing location pointer 801 and a storing location pointer 802. The executing location pointer 801 indicates an address to where there is stored a data transfer request management table 900 to be processed next after the data transfer request management table 900 being presently processed. The storing location pointer 802 indicates the address to where there is stored a newly generated data transfer request management table 900.

Figure 10:
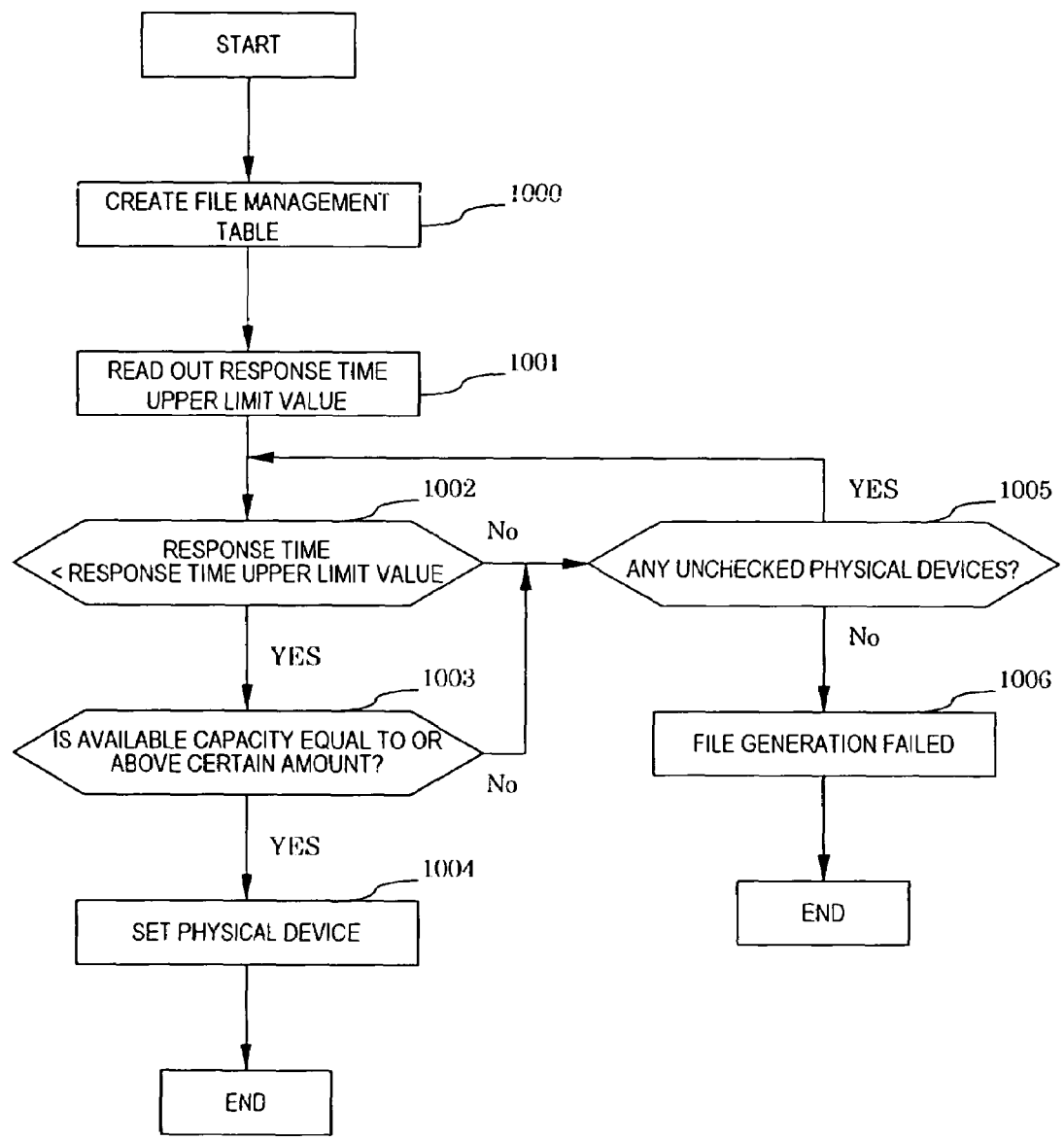
FIG. 10 is a flowchart explaining processes conducted when the storage control device receives a file generation request from a host processor according to an embodiment of the present invention.

Next, the various processes of the storage control device 10 are described. FIG. 10 shows a flowchart explaining the processes performed when the storage control device 10 receives a file generation request 600 from the host processor 20.

When the file generation request 600 is received, the control processor 101 generates a new file management table 300 in the memory 103, and sets the file name 601 and the response time upper limit value 603 sent with the file generation request 600 in this table 300 respectively (1000).

Next, the control processor 101 compares the response time upper limit value 302 of this table and the response time 202 of each storage device registered in the response time information management table 200 in order (1002). In a case a storage device with a response time 202 shorter than the response time upper limit value 302 is found, it is confirmed whether this storage device has an available capacity 203 equal to or above a predetermined amount (1003). In a case there is an available capacity equal to or more than the predetermined amount, the identification name of the storage device is set in the "storage device" 303 of the file management table 300 (1004).

On the other hand, in case there does not exist a storage device having a response time 202 shorter than the response time upper limit value 303, or, in case there exist storage devices respectively having a response time 202 equal to or shorter than the response time upper limit value 303, but where none of the storage devices has an available capacity equal to or above the predetermined amount, the control processor 101 notifies the host processor 20 of the failure to generate a file via the communication means 50 (1006).

Figure 11:
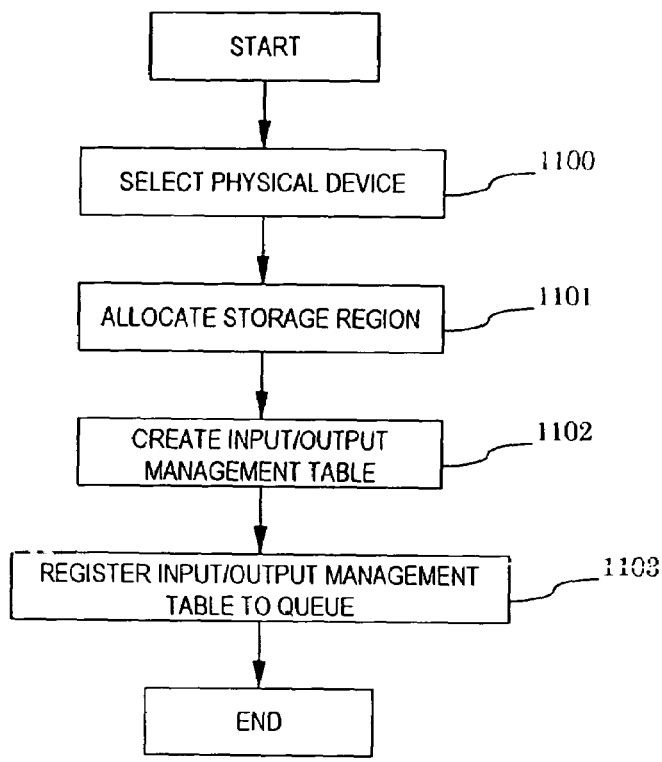
FIG. 11 is a flowchart explaining processes conducted when the storage control device receives a request from the host processor to write data to a certain file according to an embodiment of the present invention.

FIG. 11 shows a flowchart explaining the processes conducted when the storage control device 10 receives from the host processor 20 a write-in request, that is, a request to write data to a certain file. Upon receipt of the write-in request, the control processor 101 retrieves from the file management table 300 the storage device to which the relevant file is stored (1100), and allocates a storage region, which corresponds to the amount of data to be written sent with the write-in request, to the storage device (1101).

Further, to the input/output request information 404 of the input/output request management table 400, there is set a command corresponding to a WRITE process, that is, a process of writing data to a storage device. Further, the contents of the TAG number 401, the received time 402, and the storage region information 406 are set. Furthermore, the response time upper limit value 302 registered in the file management table 300 of this file is set as the response time upper limit value 405 in the input/output request management table 400 (1102). Then the control processor 101 queues this input/output request management table 400 to the queue 500 (1103).

Figure 12:
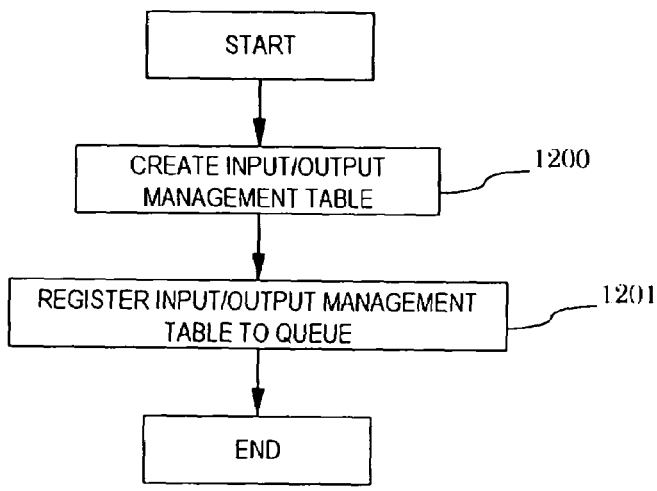
FIG. 12 is a flowchart explaining processes conducted when the storage control device receives a request from the host processor to read a certain file according to an embodiment of the present invention.

FIG. 12 shows a flowchart explaining processes performed when the storage control device 10 receives from the host processor 20 a read-out request, that is, a request to read out in view of a certain file. When the read-out request is received, the control processor 101 generates an input/output request management table 400, sets to the storage region information 406 a storage region of a storage device to be an object of the read-out request, sets to the received time 402 the time at which the read-out request was received, sets to the input/output request information 404 a command corresponding to the READ process, that is, the process of reading data from the storage device, and further sets to the response time upper limit value 405 the response time upper limit value 302 registered in the file management table 300 of the relevant file, in this table 400 (1200). Then, the input/output request management table 400 set with the above values is queued to the input/output request management queue 500 (1201).

Figure 13:
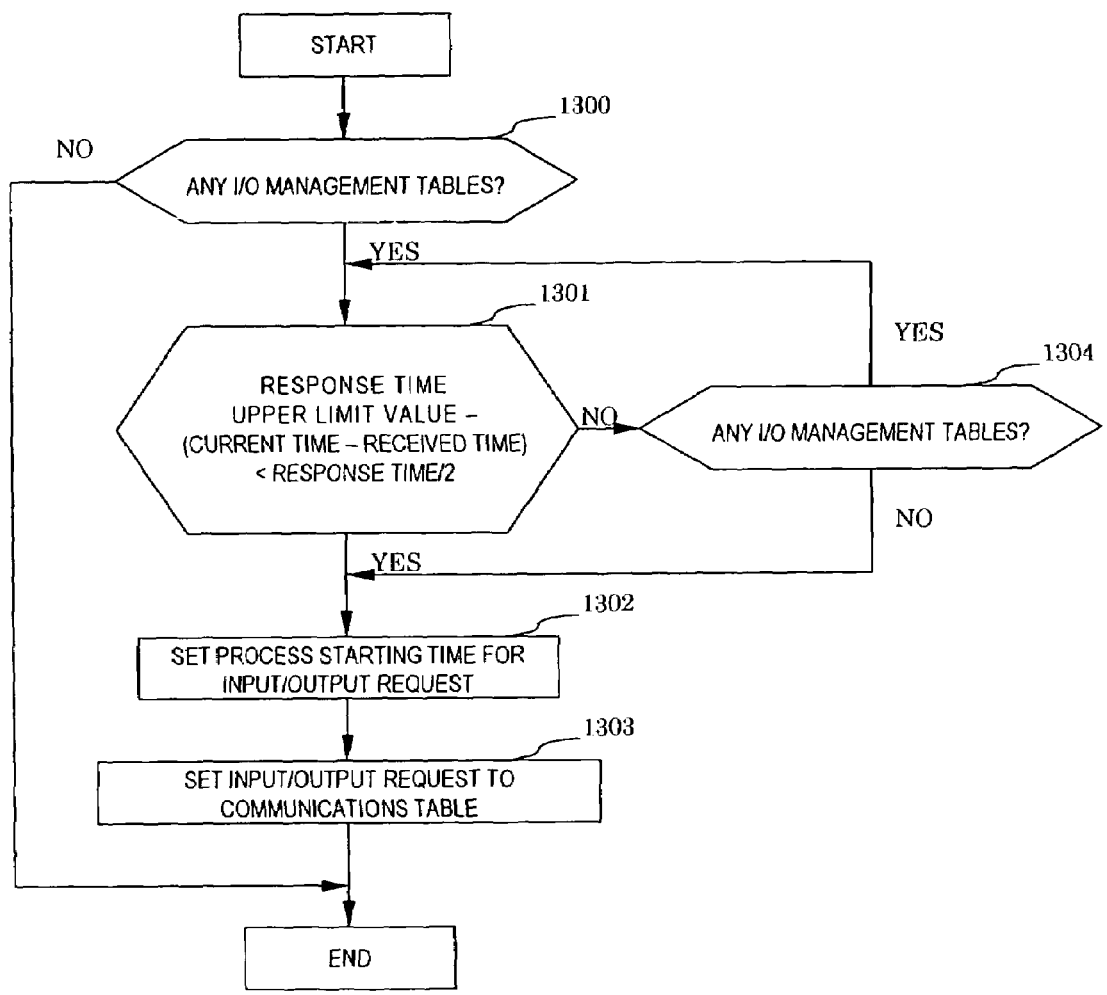
FIG. 13 is a flowchart explaining processes of an input/output request registered in an input/output request management queue conducted by the storage control device according to an embodiment of the present invention.

FIG. 13 shows a flowchart explaining the processing conducted by the storage control device 10 of the input/output request which is registered in the input/output request management queue 500. The control processor 101 refers to the input/output request management queue 500 in certain time intervals (1300). When an input/output request management table 400 is queued in the queue 500, the remaining time of the response time upper limit value 405 of the input/output request management table 400 is calculated by the following equation.

Remaining time=Response time upper limit value 405−(Current time−Received time)

Then, the control processor 101 compares the remaining time with a value obtained by multiplying a certain ratio (for example ½) to the response time 202 of a storage device to be the object of processing, which time 202 being determined from the response time information management table 200. If the remaining time is shorter (1301), that is, if there is not much time left, in order to start processing for the relevant input/output request management table 400, the current time is set to the process starting time 403 of the input/output request management table 400 (1302), and the input/output request management table 400 is transcribed to an area specified by the storing location pointer 702 of the input/output request notification table 700 in the memory 103. For the next process, the storing location pointer 702 is set to a storing location pointer 702 to be the next object of processing in the input/output request notification table 700 (1303).

On the other hand, as a result of the comparison, if the remaining time is longer than the response time 202 of the storage device, that is, if there is still time left, it is further checked to see whether or not there exists a next input/output request management table 400 in the queue 500 (1304). If there exists a next table, the processes from 1301 are performed for the next input/output request management table 400.

Figure 14:
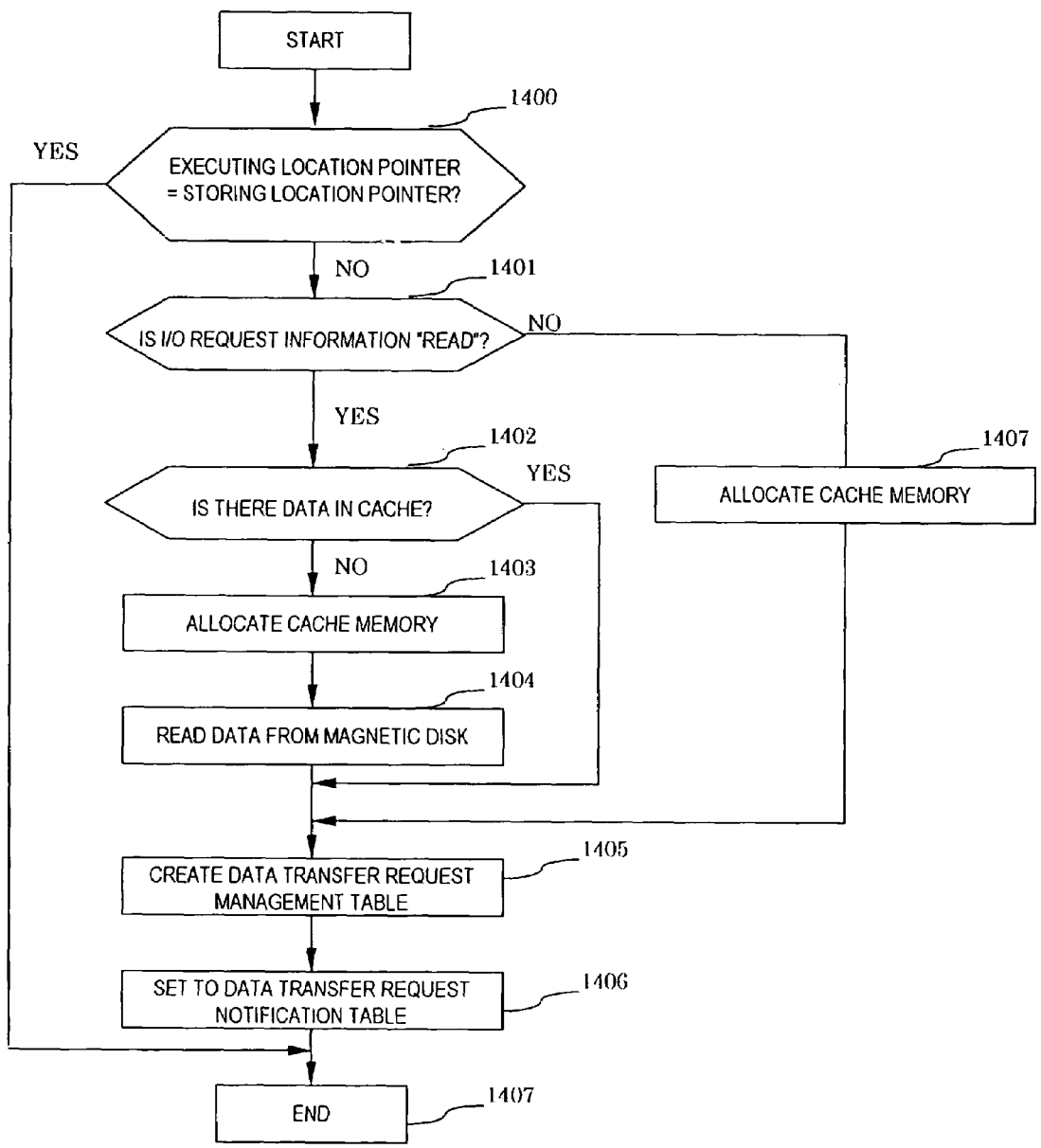
FIG. 14 is a flowchart explaining processes of the input/output request management table registered in the input/output request notification table conducted by a microprocessor according to an embodiment of the present invention.

FIG. 14 is a flowchart explaining the processing conducted by the microprocessor 102 of the input/output request management table 400 which is registered in the input/output request notification table 700. The microprocessor 102 periodically refers to the executing location pointer 701 and the storing location pointer 702 of the input/output request notification table 700 (1400). Here, if the executing location pointer 701 and the storing location pointer 702 coincide with each other, this means that there is no input/output request management table 400 which has not been executed (1407). On the other hand, if the executing location pointer 701 and the storing location pointer 702 do not coincide with each other, this means that there is an input/output request management table 400 which has not been executed.

If there is an input/output request management table 400 which has not been executed, an input/output request information 404 of the input/output request management table 400 indicated by the executing location pointer 701 is referred to, and it is determined whether the input/output request is a READ process to a storage device, that is, a process to read data from the storage device, or a WRITE process, that is, a process to write data in the storage device (1401).

In case the input/output request is a READ process, it is determined whether or not there exists data of the storage region information 406 of the input/output request management table 400 in the cache memory 104 (1402). If such data exists in the cache memory 104, a data transfer request management table 900 is generated. Further, the TAG number 401 of the input/output request management table 400 is set as a TAG number 901 of the data transfer request management table 900, the input/output request information 404 of the input/output request management table 400 is set as an input/output request information 903, and a head address of the data in the cache memory is set as a cache address 902, respectively (1405). Then, the data transfer request management table 900 generated in this way is stored in an area designated by the storing location pointer 802 of the data transfer request notification table 800. Note that, at this time, the storing location pointer 802 is set to the next area. Along with this, the executing location pointer 701 of the input/output request notification table 700 is set to the next area (1406).

On the other hand, if data does not exists in the cache memory 104, an empty area of the cache memory 104 is allocated to read data (1403), and data is read from the magnetic disk device 110 to the cache memory 104 (1404). Here, if the input/output request information 903 is not a READ process but a WRITE process, the empty area in the cache memory 104 is allocated for data to be the object of writing (1407).

Figure 15:
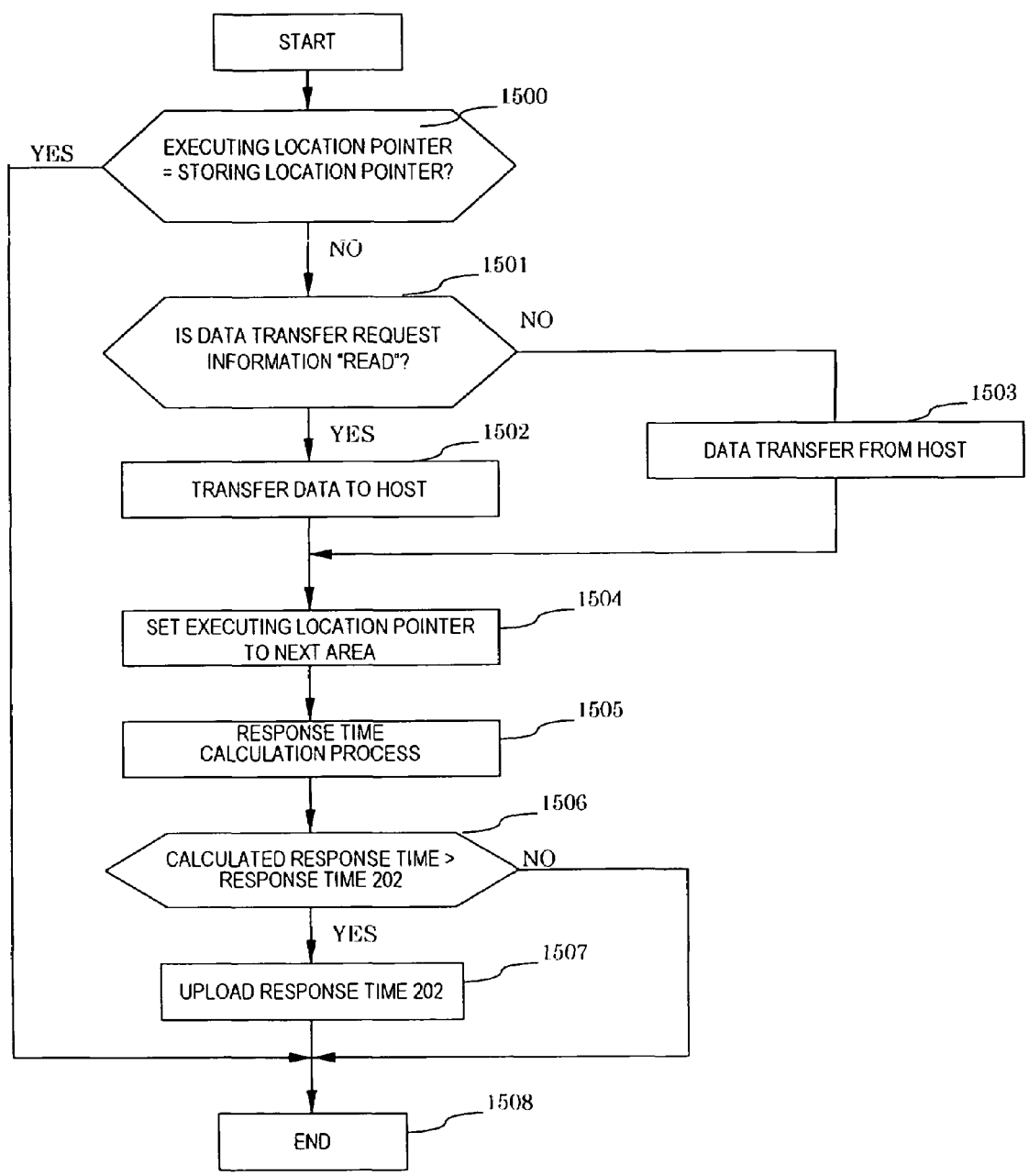
FIG. 15 is a flowchart explaining processes regarding a data transfer request table set in a data transfer request notification table conducted by the microprocessor according to an embodiment of the present invention.

FIG. 15 is a flowchart explaining processes conducted by the microprocessor 102 regarding the data transfer request management table 900 which is set in the data transfer request notification table 800. The microprocessor 101 periodically refers to the executing location pointer 801 and the storing location pointer 802 of the data transfer request management table 900 (1500). If the executing location pointer 801 and the storing location pointer 802 do not coincide with each other, the input/output request content 903 of the data transfer request management table 900 indicated by the executing location pointer 801 is referred to. If the content is a READ process, data in the cache address 902 set in the data transfer request management table 900 is transferred to the host processor 20 (1502).

On the other hand, if the input/output request is a WRITE process, data transferred from the host processor 20 is written in a region in the cache memory 104 indicated by the cache address 902 in the data transfer request management table 900 (1503), and the data is transferred to the magnetic disk device. Further, the executing location pointer 801 is set to the next area (1504). Here, the microprocessor 102 calculates a response time from the difference between the current time and the process start time 403 of the input/output request management table 400 (1505). If the calculated response time is longer than the response time 202 of the response time information management table 200, the content of the response time 202 is re-set to the calculated response time (1506) (1507), and a file rearranging process described below is further conducted.

FIG. 16 shows a flowchart explaining a file rearranging process when the response time 202 of the response time information management table 200 is updated. When the response time 202 is updated by the process 1506, the control processor 101 searches from the response time information management table 200 a file having a storage region in the storage device (1600), checks the response time upper limit value 302 of the relevant file from the file management table 300 thereof (1601), and compares the newly updated response time 202 and the response time upper limit value 302 (1602). Then, as a result of this comparison, if the response time 202 of the storage device is longer than the response time upper limit value 302, a storage device (except for the cache memory 104) having a response time 202 shorter than the response time upper limit value 302 and having an available capacity 203 larger than the file size is determined from the response time information management table 200 (1603).

If a storage device satisfying these conditions exists, the relevant file is transcribed to this storage device (1604), and the content of the storage device 303 in the file management table 300 of the file is updated to state an identification name of the storage device to where the file has been transcribed (1605). On the other hand, if a storage device satisfying the above conditions does not exist, the upper limit value setting information 304 in the file management table 300 is set stating "not possible" (1606). In this way the file rearranging process is performed.

With the above structure, the storage control device 10 of the present invention may perform processing of a file according to a response time upper limit value designated by the host processor 20 upon processing the input/output request, and it becomes possible to reflect the processing priority kept track of by the host processor 20 to an input/output process of a file.

Further, the storage control device 10 may be connected with a plurality of host processors 20. In this case, the response time upper limit value of each the files will be stored for each host processor, and storage device(s) to where the files are to be stored will be selected for each host processor 20, or, when there is an input/output request of a certain file from the host processor 20, the upper limit value of the file and the response time of each storage device will be compared and the processing priority of the relevant input/output request will be determined according to the comparison result.

In this embodiment, a response time was used as a parameter to select an existing device or to determine a processing priority. Alternatively, an average disk service rate (ADSR), or a data transfer amount (throughput) may be used. Further, the parameter does not necessarily have to be a specific value, but may be a rank corresponding to priority.

Various embodiments other than the above described embodiment may be contrived for the present invention. For example, a storage medium such as a semiconductor memory may be used besides the magnetic disk device 110. Further, the storage media do not necessarily have to be mounted to the storage control device 10, but a structure may be employed using a storage medium operated in another device which is connected to the storage control device 10 by an appropriate communication means such as Fibre Channel.

Further, the above embodiment was a structure in which the response time upper limit value was stored and managed for each file or directory. However, the response time upper limit value may be stored for each group made of a plurality of files, or for each group made of a plurality of directories, or for each group including at least one of both a file and a directory. Then, the upper limit value of the group to be stored and the response time of each of the storage devices may be compared, and a storage device to store the group may be selected according to the comparison result.

One file need not necessarily be stored in one storage device, but one file may be stored among a plurality of storage devices. The response time information management table 200 may be structured to have a list structure wherein the storage devices are arranged according to their response time. A plurality of the input/output request management queues 500 may be generated for every response time upper limit value. The response time upper limit value may be changed at any arbitrary time other than at the time of generating the file.

The rearrangement process of files is not necessarily performed immediately when the response time exceeds the response time upper limit value, but may be performed, for example, during a period of time when the load of the storage device is low by referring to such as a load information of the storage device. Further, in transcribing a file, the file may copied to a different magnetic disk device in advance at the time of writing the file, and this copied data may be indirectly transcribed to the final transcription destination.

As described above, according to the storage control device of the present invention, the operational form of the storage control device may be optimized.

Although preferred embodiments of the present invention have been described in detail, it should be understood that various changes, substitutions and alternations can be made without departing from the spirit and scope of the inventions as defined by the appended claims.

What is claimed is:

1. A storage control device for storing data communicated from a host processor, the storage control device configured to:

store a plurality of response times respectively corresponding to each of a plurality of storage devices, wherein data sent from said host processor is stored in one of said storage devices, and said response time of a storage device is a time that elapses from receipt of an input/output request from said host processor to when a processing result of said request is sent to said host processor;

respectively store one or more response-time upper limit values assigned respectively to one or more files to be stored in said storage devices; and determine a target storage device from among said storage devices in order to store a first file, said target storage device being determined based on a comparison of an upper limit value of said first file with response times of said storage devices.

2. A storage control device according to claim 1, wherein said target storage device is one of which its response time is equal to or less than said upper limit value of said first file.

3. A storage control device according to claim 1, wherein:
said storage control device stores one or more response-time upper limit values assigned respectively to one or more groups respectively comprising a plurality of files, or one or more response-time upper limit values assigned respectively to one more groups respectively comprising a plurality of directories, or one or more response-time upper limit values assigned respectively to one or more groups respectively including at least one file and at least one directory; and said storage control device further configured to determine a target storage device from among said storage devices in order to store one of said groups, said target device being determined based on a comparison of an upper limit value of said one of said groups with response times of said storage devices.

4. A storage control device according to claim 2, wherein:
said storage control device stores one or more response-time upper limit values assigned respectively to one or more groups respectively comprising a plurality of files, or one or more response-time upper limit values assigned respectively to one or more groups respectively comprising a plurality of directories, or one or more response-time upper limit values assigned respectively to one or more groups respectively including at least one file and at least one directory; and said storage control device further configured to determine a target storage device from among said storage devices in order to store one of said groups, said target device being determined based on a comparison of an upper limit value of said one of said groups with response times of said storage devices.

5. A storage control device according to claim 1, wherein:
in case a plurality of host processors are connected to said storage control device, said storage control device stores response-time upper limit values assigned respectively to each of said files respectively for each of said plurality of host processors; and said storage control device further configured to determine a storage device function respectively for each of said plurality of host processors.

6. A storage control device according to claim 1, wherein said storage control device uses an average disk service rate (ADSR) or a throughput instead of said response time.

7. A storage control device for storing data sent from a host processor, said storage control device comprising:
a computer processor that is configured to perform method steps comprising:
storing a plurality of response times respectively corresponding to each of a plurality of storage devices, wherein data sent from said host processor is stored in one of said storage devices, and said response time of a storage device is a time required from when an input/output request from said host processor is received until when a processing result of said request is sent to said host processor;

respectively storing one or more response-time upper limit values assigned respectively to one or more directories to be stored in said storage devices;

comparing said upper limit value of a directory to be stored with each of said response times of each said storage devices; and determining a storage device from said plurality of storage devices for storing said directory according to a result of said step of comparing.

8. A storage control device according to claim 7, wherein said computer processor is further configured to determine a storage device of which said response time is equal to or less than said upper limit value of said directory to be stored.

9. A storage control device according to claim 7, wherein:
said storage control device stores one or more response-time upper limit values assigned respectively to one or more groups respectively comprising a plurality of files, or one or more response-time upper limit values assigned respectively to one or more groups respectively comprising a plurality of directories, or one or more response-time upper limit values assigned respectively to one or more groups respectively including at least one file and at least one directory; and said computer processor is further configured to compare said upper limit value of one of said groups to be stored with each of said response times of each said storage devices, and to determine a storage device from said plurality of storage devices for storing said group according to a result of said comparison.

10. A storage control device according to claim 8, wherein:
said storage control device stores one or more response-time upper limit values assigned respectively to one or more groups respectively comprising a plurality of files, or one or more response-time upper limit values assigned respectively to one or more groups respectively comprising a plurality of directories, or one or more response-time upper limit values assigned respectively to one or more groups respectively including at least one file and at least one directory; and said computer processor is further configured to compare said upper limit value of one of said groups to be stored with each of said response times of each said storage devices, and to determine a storage device from said plurality of storage devices for storing said group according to a result of said comparison.

11. A storage control device according to claim 7, wherein:
in case a plurality of host processors are connected to said storage control device, said storage control device stores response-time upper limit values assigned respectively to each of said directories respectively for each of said plurality of host processors; and said computer processor is further configured to determine a storage device function respectively for each of said plurality of host processors.

12. A storage control device according to claim 7, wherein said storage control device uses an average disk service rate (ADSR) or a throughput instead of said response time.

13. A storage control device storing data sent from a host processor connected to communicate therewith, said storage control device comprising:

a first portion of memory for storing a plurality of response times respectively corresponding to each of a plurality of storage devices, wherein data sent from said host processor is stored in one of said storage devices, and said response time of a storage device is a time required from when an input/output request from said host processor is received until when a processing result of said request is sent to said host processor;

a second portion of memory for respectively storing one or more response-time upper limit values assigned respectively to one or more files to be stored in said storage devices; and a computer processor in data communication with said first portion of memory and said second portion of memory, said computer processor configured, in case there is an input/output request from said host processor in view of one of said files, to compare said upper limit value of said file with each of said response times of each said storage devices and to determine a processing priority for said input/output request according to a result of said comparison.

14. A storage control device according to claim 13, wherein:

in case a plurality of host processors are connected to said storage control device, said storage control device stores response-time upper limit values assigned respectively to each of said files respectively for each of said plurality of host processors; and said computer processor configured, in case there is an input/output request from said host processor in view of one of said files, to compare said upper limit value of said file with each of said response times of each said storage devices respectively for each of said plurality of host processors and to determine a processing priority for said input/output request according to a result of said comparison respectively for each of said plurality of host processors.

15. A storage control device according to claim 13, wherein said storage control device uses an average disk service rate (ADSR) or a throughput instead of said response time.

* * * * *